(12) United States Patent
Partridge et al.

(10) Patent No.: US 8,701,851 B2
(45) Date of Patent: Apr. 22, 2014

(54) SELECTABLE MASS FLYWHEEL

(75) Inventors: Michael Partridge, Brighton, MI (US);
Robert A. Muchmore, Dexter, MI (US);
Paul A. Piorkowski, Belleville, MI
(US); Michael S. Powell, Holt, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 317 days.

(21) Appl. No.: 13/100,700

(22) Filed: May 4, 2011

(65) Prior Publication Data
US 2012/0085198 A1 Apr. 12, 2012

Related U.S. Application Data

(60) Provisional application No. 61/391,324, filed on Oct. 8, 2010.

(51) Int. Cl.
*F16F 15/31* (2006.01)

(52) U.S. Cl.
USPC ............ 192/53.3; 192/30 V; 74/574.4

(58) Field of Classification Search
None
See application file for complete search history.

(56) References Cited

U.S. PATENT DOCUMENTS

| | | | |
|---|---|---|---|
| 4,624,351 A * | 11/1986 | Lutz et al. ............ 192/30 V |
| 5,094,329 A | 3/1992 | Maguire | |
| 5,121,821 A | 6/1992 | Poorman et al. | |
| 5,398,562 A | 3/1995 | Muchmore | |
| 6,663,526 B2 | 12/2003 | Janson | |
| 6,668,995 B2 | 12/2003 | Janson et al. | |
| 7,630,811 B2 | 12/2009 | Jiang | |
| 2003/0130082 A1 | 7/2003 | Janson | |
| 2003/0213672 A1 | 11/2003 | Janson et al. | |
| 2005/0037848 A1 | 2/2005 | Yamamoto et al. | |
| 2005/0126318 A1 | 6/2005 | Xue et al. | |
| 2006/0185959 A1 | 8/2006 | Tsuruta et al. | |
| 2006/0201767 A1 | 9/2006 | Tsuruta et al. | |
| 2006/0254875 A1 | 11/2006 | Uehara et al. | |
| 2006/0260898 A1 | 11/2006 | Tsuruta et al. | |
| 2007/0099710 A1 | 5/2007 | Yamamoto et al. | |
| 2009/0280941 A1 | 11/2009 | Dusenberry et al. | |
| 2010/0071652 A1 | 3/2010 | Almhagen et al. | |
| 2010/0210365 A1 | 8/2010 | Schober et al. | |

* cited by examiner

*Primary Examiner* — Rodney Bonck

(57) ABSTRACT

A selectable mass flywheel assembly for a powertrain of a motor vehicle includes a first mass and a second mass. The first mass is connected to a crankshaft of an engine and the second mass engages with a clutch to transfer torque from the engine to a transmission. The two masses are rotationally coupled to each other with a spring and damper assembly. The flywheel assembly further includes a locking mechanism that engages both masses during the startup of the engine to lock the two masses together to minimize the vibrations and pulsations in the powertrain during startup of the engine.

16 Claims, 4 Drawing Sheets

SELECTABLE MASS FLYWHEEL

RELATED PATENT APPLICATION

This application claims the benefit of U.S. Provisional Application No. 61/391,324, filed on Oct. 8, 2010. The entire contents of the above application are incorporated herein by reference.

FIELD

The present disclosure relates to a flywheel for a motor vehicle powertrain. More specifically, the disclosure relates to a selectable mass flywheel.

BACKGROUND

The statements in this section merely provide background information related to the present disclosure and may not constitute prior art.

Conventional vehicle powertrains regularly employ a flywheel in the drive train between an engine and a clutch. When the clutch is engaged, the flywheel helps to reduce vibrations from propagating from the engine through the powertrain. With increased demand for improved vibration characteristics in vehicles, the single mass flywheel, however, has been inadequate in particular situations, such as, for example, in their use in smaller engines.

As a result, some powertrain arrangements employ a dual mass flywheel with a pair of rotating masses connected to each other with a spring and damper system to reduce the amount of torsional vibrations in the powertrain. A first mass is connected to the engine crankshaft on the engine side of the spring and damper system and a second mass is connected to the clutch side of the spring and damper system. The first mass, however, typically has a lower inertia than a conventional single flywheel and, therefore, is not as effective in reducing engine pulsations and vibrations since these vibrations are reduced only by the inertia of the first mass. In view of the above, it is apparent there exists a need for a flywheel assembly that further reduces powertrain vibrations.

SUMMARY

In one form of the present invention, a selectable mass flywheel assembly for a motor vehicle powertrain includes a first mass and a second mass. The first mass is connected to a crankshaft of an engine and the second mass engages with a clutch to transfer torque from the engine to a transmission. The two masses are rotationally coupled to each other with a spring and damper assembly. The flywheel assembly further includes a locking mechanism that engages both masses during the startup of the engine to lock the two masses together to minimize the vibrations and pulsations in the powertrain during startup of the engine.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating principles of the invention. Moreover, like reference characters designate corresponding parts throughout the different views. In the drawings.

Figure 3:
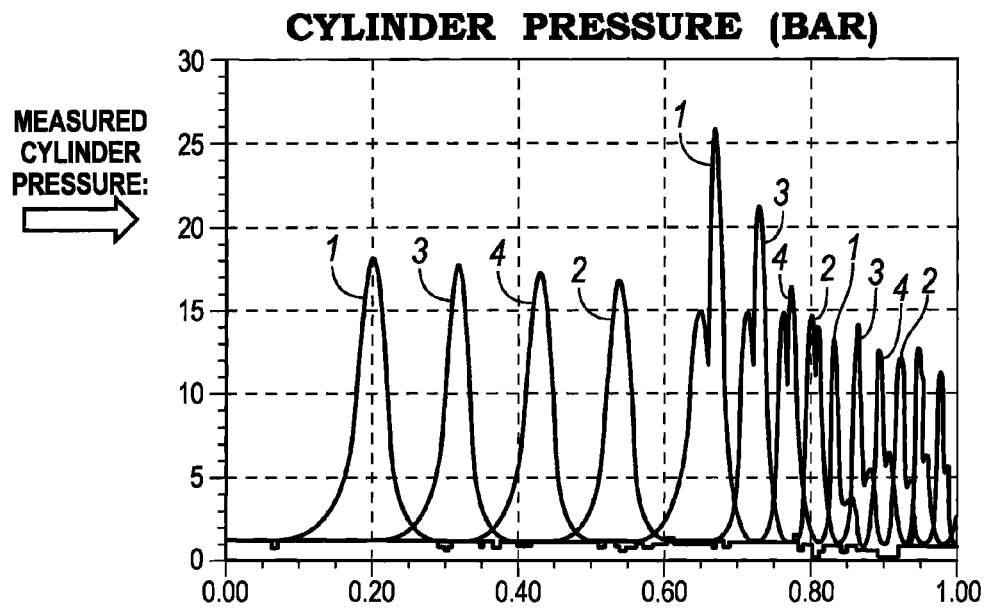
FIG. 3 is a graph of simulation data of a 1.4 liter 4 cylinder engine illustrating the cylinder pressure in each cylinder versus time.
Figure 4A:
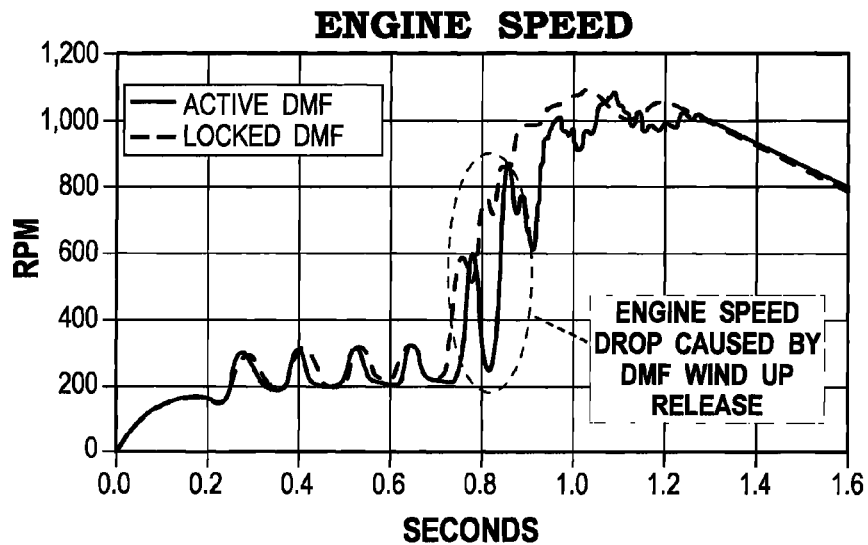
FIG. 4a is a graph of simulation data corresponding to the engine simulation data of FIG. 3 showing the engine speed versus time when a first mass and a second mass of a selectable mass flywheel assembly are unlocked (solid line) and locked together (dashed line) in accordance with the principles of the invention.
Figure 4B:
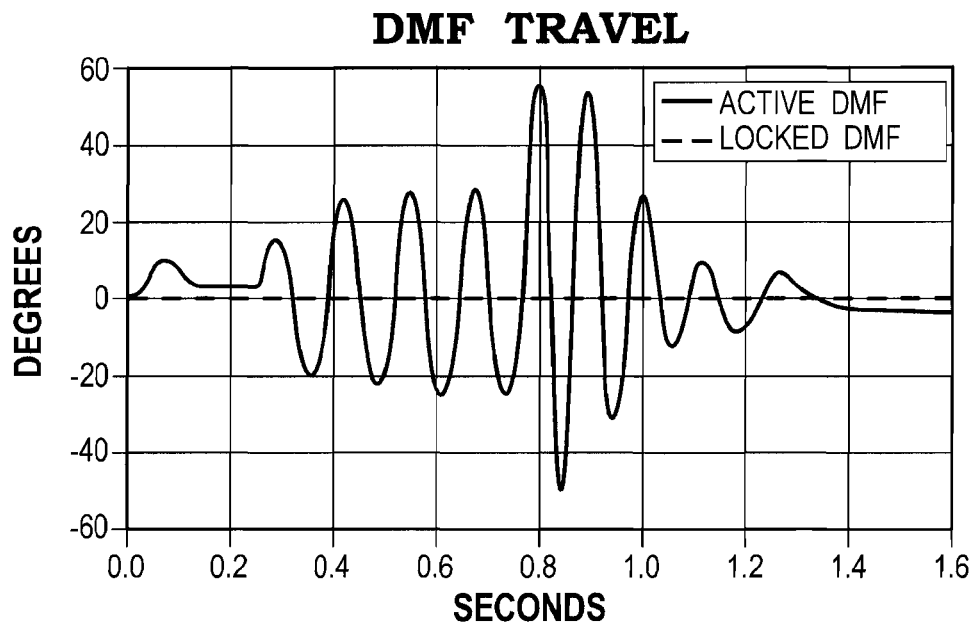
Figure 4C:
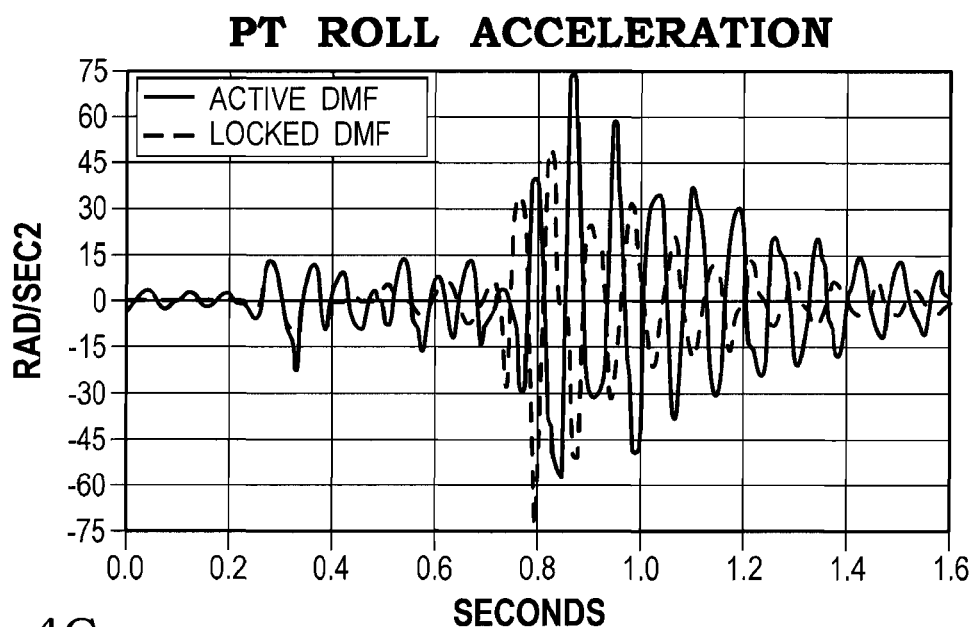

FIG. 4b is a graph of simulation data corresponding to the engine simulation data of FIG. 3 showing relative angular rotation between the first mass and the second mass of the selectable mass flywheel assembly when the two mass are unlocked (solid line) and locked together (dashed line) in accordance with the principles of the invention; and FIG. 4c is a graph of simulation data corresponding to the engine simulation data of FIG. 3 showing powertrain roll acceleration versus time when the first mass and the second mass of the selectable mass flywheel assembly are unlocked (solid line) and locked together (dashed line) in accordance with the principles of the invention.

DETAILED DESCRIPTION

The following description is merely exemplary in nature and is not intended to limit the present disclosure, application, or uses.

Referring now to the drawings, a motor vehicle powertrain with a selectable mass flywheel incorporating the principles of the present invention is illustrated therein and designated at 10. The main components of the powertrain include an engine 12, a starter motor 14, and a selectable mass flywheel assembly 15 associated with a transmission 17. The selectable mass flywheel 15 includes a first mass 16 connected to the engine 12 with a crankshaft 18 and a second mass 20 that selectively engages, as indicated by line 19, a clutch 21 associated with the transmission 17 of the powertrain 10. The first mass 16 and the second mass 20 are coupled together with a spring damper system 26 that includes a spring 28 and a damper 30 and are arranged to provide limited angular rotation between the first mass 16 and the second mass 20.

When the clutch 21 is engaged with the second mass 20, the torque generated by the engine 12 is transmitted through the crankshaft 18 and the selectable mass flywheel 15. The clutch 21, in turn, transmits the torque to a set of gears 24 in the transmission 17 through a drive shaft 22.

The first mass 16 and the second mass 20 are arranged to be rotatable relative to each other over a limited angular distance. That is, the two masses 16 and 20 are coupled to each other through the spring 28 such that rotational movement between the two masses 16 and 20 creates a rotational deflection in the spring 28, which generates a restoring torque between the two masses. The combination of the spring 18 and the damper 30 lowers the level of torsional vibrations generated by the firing of the engine 12.

The selectable mass flywheel assembly 15 further includes a locking mechanism 32 that is activated by the starter motor 14 through a starter activated connection 33 when the driver of the vehicle so desires. During startup of the engine 12, the locking mechanism 32 engages both the first and second masses 16 and 20 to effectively pin or lock the two flywheel masses 16 and 20 together.

Figure 1:
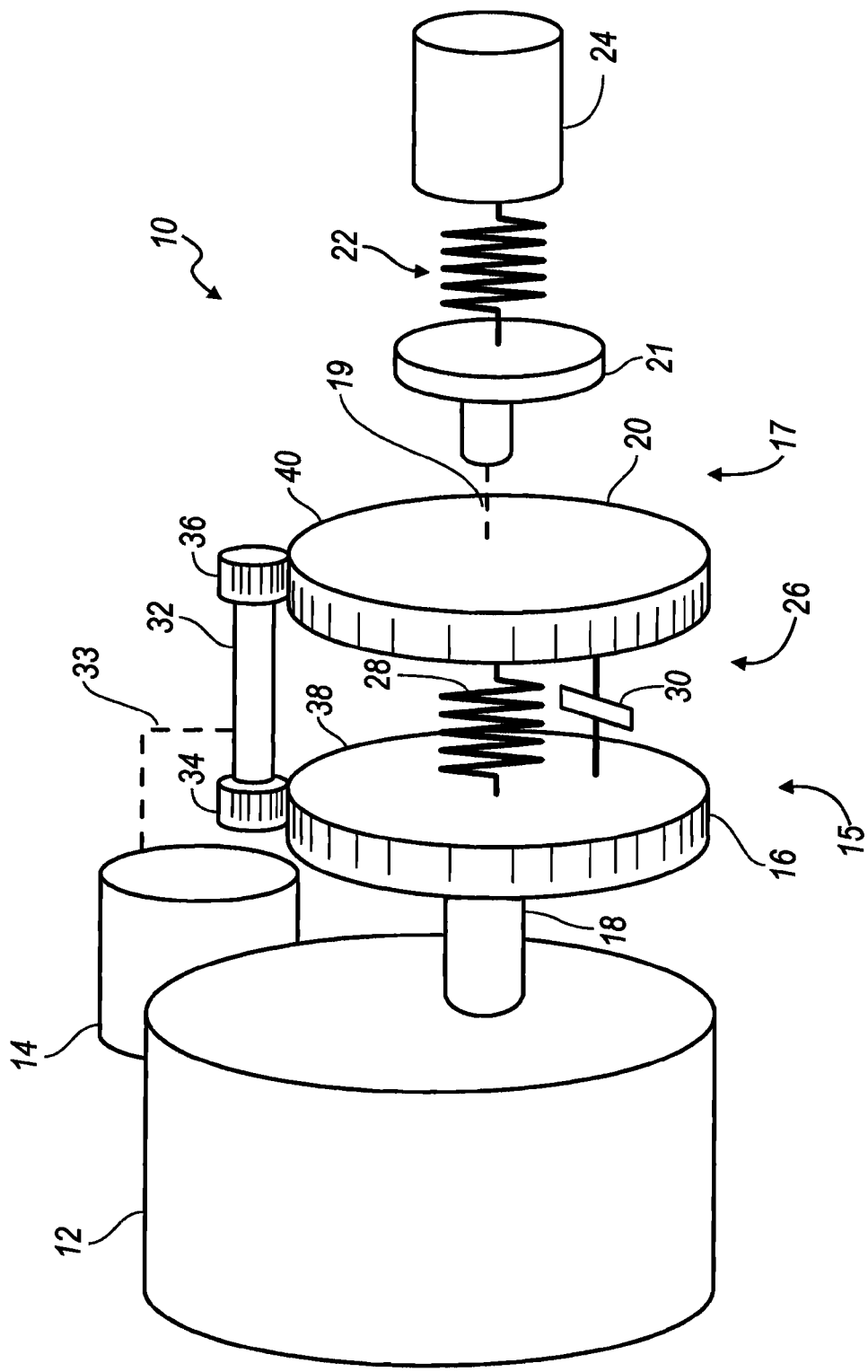
FIG. 1 is a schematic diagram of a powertrain in accordance with the principles of the present invention.

In the particular arrangement shown in FIG. 1, the locking mechanism 32 is a shaft with a pinion gear 34 at one end of the shaft 32 and another pinion gear 36 at the other end. During startup of the engine 12, the pinion gears 34 and 36 engage and mesh with teeth 38 and 40 around the periphery of the first mass 16 and the second mass 20, respectively, to lock the two masses together. Accordingly, when the locking mechanism is activated by the starter motor 14, the relative rotational movement between the first mass 16 and the second mass 20 is eliminated or minimized.

Other arrangements for the locking mechanism 32 are contemplated as well. For example, the locking mechanism can be a latch mechanism that locks the two masses together. In another arrangement, the locking mechanism can be a pin attached or provided on one of the masses 16 or 20 that engages a hole in the other mass during startup. In yet another form, a pin on one of the masses engages with a slot on the other mass for situations in which it is desirable to reduce but not eliminate the relative angular movement between the first mass 16 and the second mass 20 during startup of the engine.

Figure 2A:
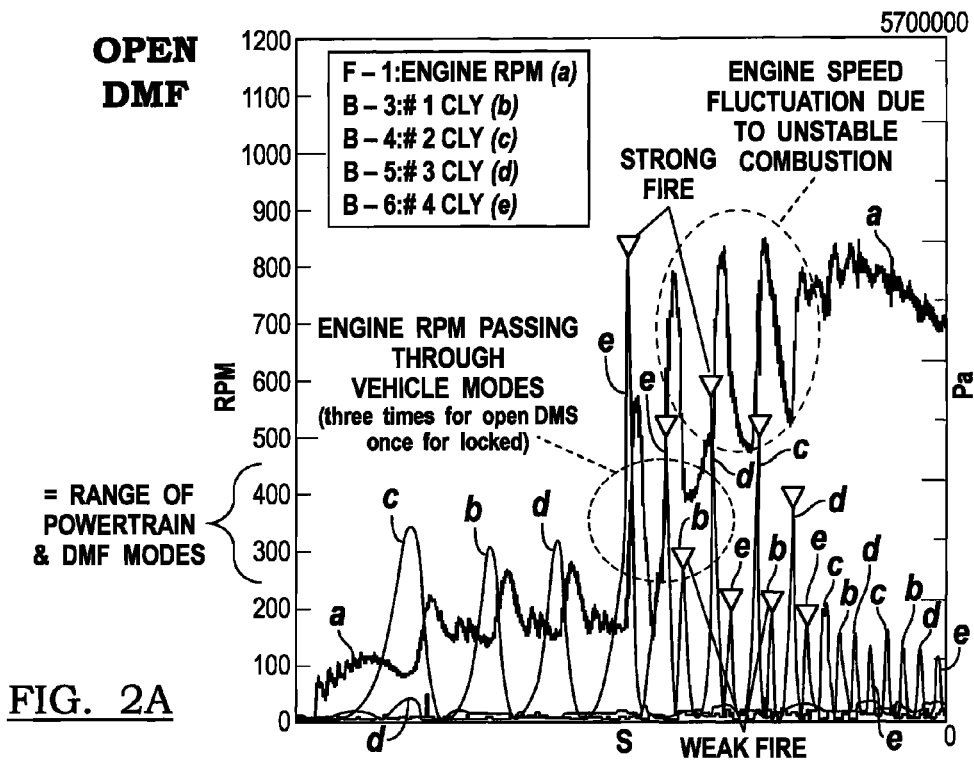
FIG. 2a is a graph of test data for a 2.5 liter 4 cylinder engine during startup showing unstable combustion when a first mass and a second mass of a selectable mass flywheel assembly are not locked together.
Figure 2B:
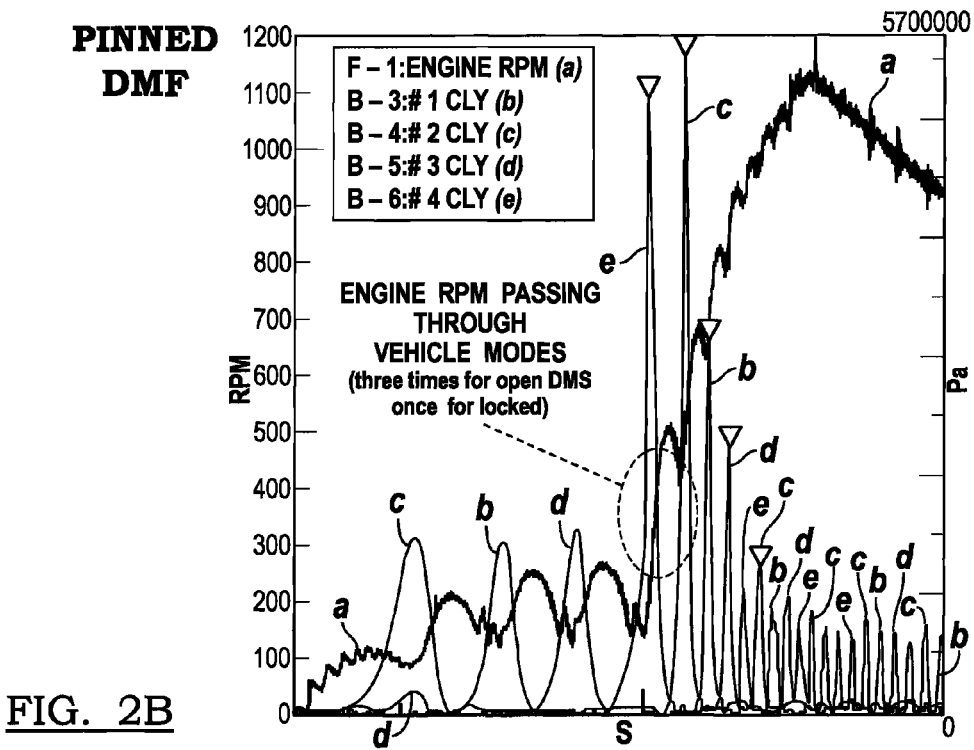
FIG. 2b is a graph of test data for the 2.5 liter 4 cylinder engine showing stable combustion when the first mass and the second mass of the selectable mass flywheel assembly are locked together in accordance with the principles of the present invention.

Shown in FIGS. 2a and 2b are experimental results for a 2.5 liter 4 cylinder engine illustrating the effects of the use of a selectable mass flywheel such as the selectable mass flywheel 15. Specifically, FIG. 2a shows test data for the engine during startup when the first mass 16 and the second mass 20 are not locked together, and FIG. 2b shows data for the engine during startup when the two masses are locked together. For each graph, the abscissa represents time from 0 to 0.6 seconds, the left-hand ordinate represents the engine speed from 0 to 1200 rpm, and the right-hand ordinate represents the cylinder pressure from 0 to 5,700,000 Pa. Further, the specific engine speed data is identified by the label (a) and the specific pressures in each of the four cylinders are identified by the labels (b), (c), (d), and (e). Between 0 and about 0.3 sec, the starter is essentially producing the compression stroke and in the case for FIG. 2b, the starter mechanism 15 locks the two masses 16 and 20 together. At about 0.3 sec, the first cylinder fires and shortly thereafter (at around 0.4 sec) the starter 14 disengages from the engine 12, and, specifically in the case for FIG. 2b, the locking mechanism 15 disengages from the first and second masses 16 and 20, thereby unlocking the two masses.

In FIG. 2a, there are two regions of particular interest with respect to the cylinder pressures when combustion begins to occur in the cylinders after around 0.3 sec. In the first, labeled strong fire, the first mass 16 rotates and winds up the spring damper system 26 producing high pressures in the cylinders. In the second region, labeled weak fire, the torsional forces resulting from the wound up spring damper system 26 causes the second mass 20 to rotate quickly to release the stored energy in the spring damper system 26 resulting in lower pressures in the cylinders. Accordingly, the windup and release of the spring damper system results in unstable combustion as indicated by the large fluctuations in the engine speed, as indicated by the upper dashed oval.

In contrast, as shown in FIG. 2b, the locking mechanism 15 locks the two masses 16 and 20 from 0 sec to about 0.4 sec. As indicated in FIG. 2b, the increased rotational inertia resulting from locking the two masses 16 and 20 damps out or eliminates the windup and release effects described above, which stabilizes the combustion in the cylinders. Further note that the time span in which the engine vibrations result in various vibration modes in the vehicle is reduced by about a factor of three, as indicated by the lower dashed ovals in FIGS. 2a and 2b.

Turning now to FIG. 3, there is shown a graph of simulation data of a 1.4 liter 4 cylinder engine illustrating the cylinder pressure (BAR) in each cylinder plotted against time (seconds). The pressure (0 to 30 BAR) is along the ordinate, and time (0 to 1 second) is along the abscissa. Around 0.8 sec, the first cylinder fires, and then around 0.9 sec the starter disengages from the engine. Prior to 0.8 sec, the fluctuations in the cylinder pressure result from the starter producing the compression stroke.

FIG. 4a is a graph of simulation data corresponding to the engine data of FIG. 3 showing the engine speed (rpm) versus time (seconds) when a first mass and a second mass of a selectable mass flywheel assembly are unlocked (solid line) and locked together (dashed line) in accordance with the principles of the invention. For the locked case, a locking mechanism such as the locking mechanism 15 locks the two masses together at 0 sec and disengages from the two masses when the starter disengages from the engine at around 0.9 sec. As can easily be seen, there are much larger engine speed fluctuations, as compared to locked arrangement, when the two masses are not locked together from about 0.8 sec to about 1.2 secs.

Shown in FIG. 4b is a graph of simulation data showing relative angular rotation between the first mass and the second mass of the selectable mass flywheel assembly 15 when the two mass are unlocked (solid line) and locked together (dashed line). In the unlocked arrangement, one can easily see large angular variations between the two masses after the first cylinder fires (at about 0.8 sec). In contrast, there is minimal to no angular variations when the two masses are locked together.

Finally, FIG. 4c is a graph of simulation data showing powertrain roll acceleration (that is, the rotational acceleration around the center of gravity of the powertrain) versus time when the first mass and the second mass of the selectable mass flywheel assembly are unlocked (solid line) and locked together (dashed line). After about 0.8 sec and afterwards, one can see that the unlocked arrangement results in much larger fluctuations for the powertrain roll acceleration than the locked arrangement.

The description of the invention is merely exemplary in nature and variations that do not depart from the gist of the invention are intended to be within the scope of the invention. Such variations are not to be regarded as a departure from the spirit and scope of the invention.

What is claimed is:

1. A selectable mass flywheel for a powertrain of a motor vehicle comprising:
   a first mass connected to an engine of the powertrain with a crankshaft;
   a second mass that selectively engages a clutch of the powertrain to transfer torque from the engine to a transmission, the second mass and the first mass being rotatable relative to each other over a limited angular distance; and
   a spring damper system positioned between and coupling the first mass and the second mass, wherein the spring damper system is not in contact with the crankshaft and wherein the spring damper system includes a spring and a damper arranged to provide limited angular rotation between the first mass and the second mass; and a locking mechanism that engages the first mass and the second mass during startup of the engine to minimize vibrations and pulsations in the powertrain during startup of the engine, the locking mechanism reducing vehicle vibration modes by about a factor of three when the locking mechanism locks the first mass and the second mass together.

2. The selectable mass flywheel of claim 1 wherein the rotational movement of either mass relative to the other mass creates a rotational deflection in the spring.

3. The selectable mass flywheel of claim 2 wherein the rotational deflection generates a restoring torque between the first mass and the second mass.

4. The selectable mass flywheel of claim 1 wherein the locking mechanism is activated by a starter motor of the powertrain.

5. The selectable mass flywheel of claim 1 wherein the locking mechanism includes a shaft, a first pinion gear at one end of the shaft, and a second pinion gear at the other end of the shaft.

6. The selectable mass flywheel of claim 5 wherein the first mass includes a first set of teeth around the outer periphery of the first mass and the second mass includes a second set of teeth around the outer periphery of the second mass, the first pinion gear engaging with the first set of teeth and the second pinion gear engaging the second set of teeth when the starter mechanism is activated.

7. The selectable mass flywheel of claim 1 wherein the locking mechanism is a latch that locks the first mass and the second mass together.

8. A transmission for a powertrain of a motor vehicle comprising:
   a first mass connected to an engine of the powertrain with a crankshaft;
   a second mass, the second mass and the first mass being rotatable relative to each other over a limited angular distance;
   a clutch assembly that selectively engages the second mass to transfer torque from the engine to the transmission; and
   a spring damper system positioned between and coupling the first mass and the second mass, wherein the spring damper system is not in contact with the crankshaft and wherein the spring damper system includes a spring and a damper arranged to provide limited angular rotation between the first mass and the second mass; and
   a locking mechanism that engages the first mass and the second mass during startup of the engine to minimize vibrations and pulsations in the powertrain during startup of the engine, the locking mechanism reducing vehicle vibration modes by about a factor of three when the locking mechanism locks the first mass and the second mass together.

9. The transmission of claim 8 wherein the rotational movement of either mass relative to the other mass creates a rotational deflection in the spring.

10. The transmission of claim 9 wherein the rotational deflection generates a restoring torque between the first mass and the second mass.

11. The transmission of 8 wherein the locking mechanism is activated by a starter motor of the powertrain.

12. The transmission of claim 8 wherein the locking mechanism includes a shaft, a first pinion gear at one end of the shaft, and a second pinion gear at the other end of the shaft.

13. The transmission of claim 12 wherein the first mass includes a first set of teeth around the outer periphery of the first mass and the second mass includes a second set of teeth around the outer periphery of the second mass, the first pinion gear engaging with the first set of teeth and the second pinion gear engaging the second set of teeth when the starter mechanism is activated.

14. A powertrain for a motor vehicle comprising:
   an engine; and
   a transmission including:
      a first mass connected to the engine with a crankshaft;
      a second mass, the second mass and the first mass being rotatable relative to each other over a limited angular distance;
      a clutch assembly that selectively engages the second mass to transfer torque from the engine to the transmission;
      a spring damper system positioned between and coupling the first mass and the second mass, wherein the spring damper system is not in contact with the crankshaft and wherein the spring damper system includes a spring and a damper arranged to provide limited angular rotation between the first mass and the second mass; and
   a locking mechanism that engages the first mass and the second mass during startup of the engine to minimize vibrations and pulsations in the powertrain during startup of the engine, the locking mechanism reducing vehicle vibration modes by about a factor of three when the locking mechanism locks the first mass and the second mass together.

15. The powertrain of claim 14 wherein the locking mechanism includes a shaft, a first pinion gear at one end of the shaft, and a second pinion gear at the other end of the shaft.

16. The powertrain of claim 15 wherein the first mass includes a first set of teeth around the outer periphery of the first mass and the second mass includes a second set of teeth around the outer periphery of the second mass, the first pinion gear engaging with the first set of teeth and the second pinion gear engaging the second set of teeth when the starter mechanism is activated.

* * * * *